(12) United States Patent
Madhav

(10) Patent No.: US 11,705,090 B2
(45) Date of Patent: Jul. 18, 2023

(54) APPARATUS, SYSTEMS, AND METHODS FOR PROVIDING A REARWARD VIEW OF AIRCRAFT

(71) Applicant: The Boeing Company, Chicago, IL (US)

(72) Inventor: Jagdish T. Madhav, Bothell, WA (US)

(73) Assignee: The Boeing Company, Chicago, IL (US)

( * ) Notice: Subject to any disclaimer, the term of this patent is extended or adjusted under 35 U.S.C. 154(b) by 278 days.

(21) Appl. No.: 16/891,915

(22) Filed: Jun. 3, 2020

(65) Prior Publication Data

US 2021/0383775 A1 Dec. 9, 2021

(51) Int. Cl.
| | |
|---|---|
| G09G 5/377 | (2006.01) |
| G06T 7/70 | (2017.01) |
| H04N 7/18 | (2006.01) |
| H04N 23/54 | (2023.01) |
| H04N 23/90 | (2023.01) |

(52) U.S. Cl.
CPC .............. *G09G 5/377* (2013.01); *G06T 7/70* (2017.01); *H04N 7/181* (2013.01); *H04N 23/54* (2023.01); *H04N 23/90* (2023.01); *G06T 2207/30252* (2013.01); *G09G 2354/00* (2013.01); *G09G 2380/12* (2013.01)

(58) Field of Classification Search
CPC .............. G09G 5/377; G09G 2354/00; G09G 2380/12; G06T 7/70; H04N 5/2253; H04N 5/247

See application file for complete search history.

(56) References Cited

U.S. PATENT DOCUMENTS

| 7,342,514 | B1* | 3/2008 | Bailey | G01C 23/005 340/961 |
|---|---|---|---|---|
| 2010/0238161 | A1* | 9/2010 | Varga | G06T 17/05 345/419 |
| 2013/0200207 | A1* | 8/2013 | Pongratz | B64C 39/024 244/2 |
| 2013/0334370 | A1* | 12/2013 | Coll Herrero | G05D 1/0202 244/135 A |
| 2015/0194059 | A1* | 7/2015 | Starr | G08G 5/0017 701/3 |
| 2015/0293225 | A1* | 10/2015 | Riley | G05D 1/104 356/4.01 |
| 2019/0049268 | A1* | 2/2019 | Mohan | G08G 5/025 |
| 2019/0286916 | A1* | 9/2019 | Yan | G06K 9/6211 |

* cited by examiner

*Primary Examiner* — Robert J Michaud
(74) *Attorney, Agent, or Firm* — Parsons Behle & Latimer

(57) ABSTRACT

Apparatus, systems, and methods for providing a rearward view of an aircraft. The system, apparatus, and methods include one or more cameras disposed on an aft portion of a fuselage of the aircraft, a heads-up display is within a cockpit of the aircraft, and a heads-up control. The heads-up control receives image data from the one or more cameras and generates an image on the heads-up display based on the image data from the one or more cameras to provide a rearward view of an area behind the aircraft. The heads-up control may be configured to determine when an aerial object is within a predetermined range behind the aircraft and responsively generate the image on the heads-up display based on the image data from the one or more cameras to provide a rearward view of an area behind the aircraft in which the aerial object is located.

20 Claims, 6 Drawing Sheets

APPARATUS, SYSTEMS, AND METHODS FOR PROVIDING A REARWARD VIEW OF AIRCRAFT

FIELD OF THE DISCLOSURE

The examples described herein relate to apparatus, systems, and methods for providing a rearward view of an aircraft.

BACKGROUND

Description of the Related Art

When operating an aircraft, it can be very difficult to observe an object approaching the aircraft from the rear or aft portion of the aircraft. During flight, various aerial objects may approach an aircraft such as, but not limited to, another aircraft, a missile, or a rocket. It may be very important for the pilot of an aircraft to be able to observe the aerial object as it approaches. It may also be important for a pilot of an aircraft to be able to view objects behind the aircraft when the aircraft is located on the ground. The fuselage and/or bulkheads of the aircraft may prevent a pilot from clearly observing objects located behind the aircraft that may be approaching the aircraft. Other disadvantages may exist.

SUMMARY

The present disclosure is directed to apparatus, systems, and methods for providing a rearward view of an aircraft.

One example of the present disclosure is a system for an aircraft. The system includes one or more cameras disposed on an aft portion of a fuselage of the aircraft. The system includes a heads-up display within a cockpit of the aircraft. The system includes a heads-up control that receives image data from the one or more cameras. The heads-up control is configured to generate an image on the heads-up display based on the image data from the one or more cameras to provide a rearward view of an area behind the aircraft.

The heads-up control may be configured to determine when an aerial object is within a predetermined range behind the aircraft and responsively generate the image on the heads-up display based on the image data from the one or more cameras to provide a rearward view of an area behind the aircraft in which the aerial object is located. The aerial object may be an aircraft, a missile, or a rocket. The system may include a first camera disposed on a right side of the aft portion of the fuselage and a second camera disposed on a left side of the aft portion of the fuselage. The heads-up control may receive image data from the first camera and the second camera, and the rearward view may be a stitched rearward view based on image data from the first camera and the second camera. The heads-up control may be configured to determine whether the aerial object is approaching the aircraft via processing the image data.

The system may include an onboard radar system. The heads-up control may be configured to determine when an aerial object is within a predetermined range behind the aircraft based on data from the onboard radar system. The heads-up control may be configured to determine when an aerial object is within a predetermined range behind the aircraft based on information from a flight interval management (FIM) avionics system. The heads-up control may be configured to determine when an aerial object is within a predetermined range behind the aircraft based on an automatic dependent surveillance-broadcast (ADS-B) signal. The heads-up control may generate the image on the heads-up display when the heads-up control determines the aerial object is within the predetermined range. The heads-up control may be configured to determine when a second aircraft is behind the aircraft and may generate the image on the heads-up display based on the image data from the one or more cameras to provide a rearward view of an area behind the aircraft when the aircraft and the second aircraft are both on the ground.

One example of the present disclosure is an apparatus that includes a heads-up display and a heads-up control connected to the heads-up display. The heads-up control generates an image on the heads-up display from image data from one or more cameras disposed on an aft portion of an aircraft. The generated image may be overlaid on information previously displayed on the heads-up display so that the information and the generated image are both visible on the heads-up display. The generated image may obscure information previously displayed on the heads-up display.

The generated image may be a stitched together image from image data from a first camera disposed on a right side of the aft portion of an aircraft and image data from a second camera disposed on a left side of the aft portion of the aircraft. The generated image may be a mirror image of a rearward view from the aircraft with an image from the first camera and an image from the second camera being flipped side by side on the heads-up display. The heads-up control may generate the image on the heads-up display in response to determining that an object is within a predetermined range behind the aircraft. The object may be in-flight or may be positioned on the ground.

One example of the present disclosure is a method for providing a rearward view of an aircraft. The method includes providing image data acquired from one or more rearward facing cameras from an aft portion of the aircraft. The method includes generating an image on a heads-up display in a cockpit of an aircraft based on the image data.

Providing image data may include providing acquired image data from a first camera disposed on a right side of the aft portion of the aircraft and a second camera disposed on a left side of the aft portion of the aircraft, and generating an image on the heads-up display comprising generating a stitched rearward view based on image data from the first camera and the second camera. The method may include determining whether an object is within a predetermined range behind the aircraft prior to generating the image on the heads-up display. The method may include receiving information from a flight interval management (FIM) avionics system, receiving an automatic dependent surveillance-broadcast (ADS-B) signal, or receiving information from an on-board radar system to determine if the object is within the predetermined range of the aircraft.

Figure 1:
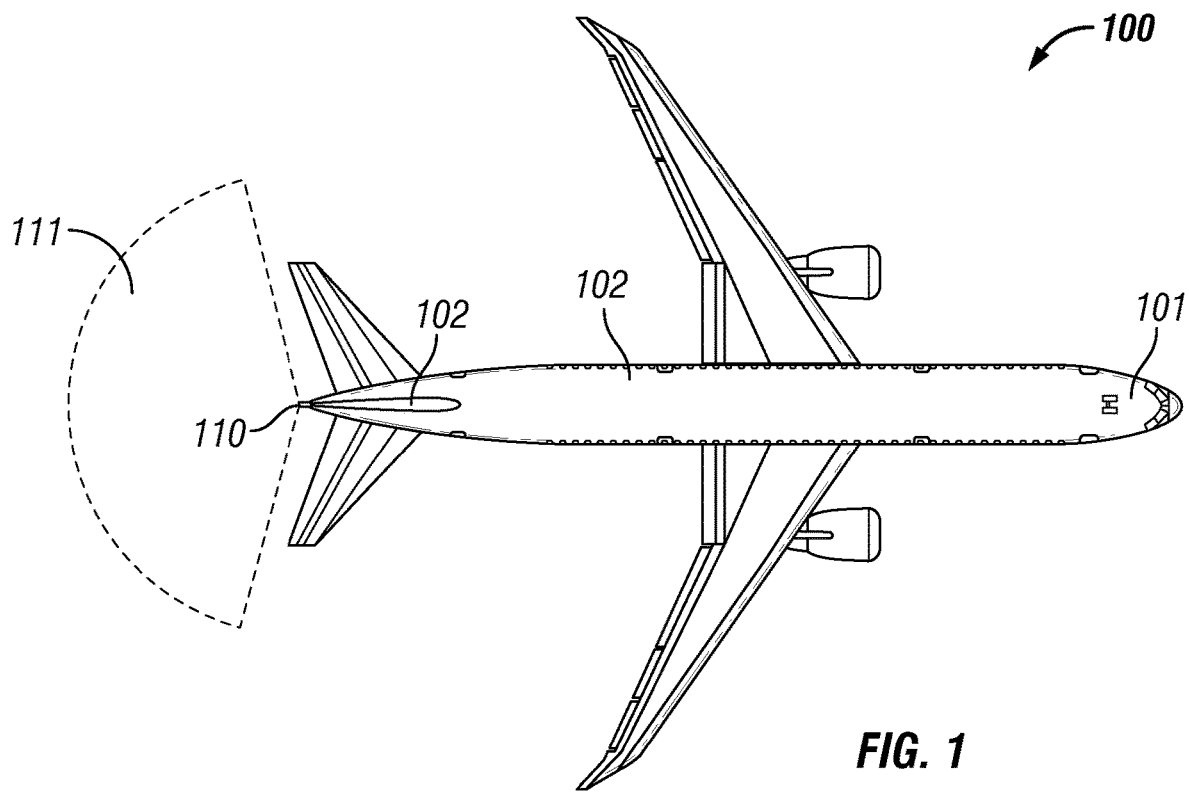
FIG. 1 is a schematic of an example aircraft having one or more cameras positioned to acquire a rearward view behind the aircraft.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 is a schematic of an aircraft 100 with a cockpit 101, also referred to as a flight deck, at a front portion of the aircraft 100 and an aft portion 102 at the aft of the aircraft 100. The aircraft 100 includes one or more cameras 110 disposed on the aft portion 102 of the fuselage 103 of the aircraft 100 to acquire a rearward view 111 of the area behind the aircraft 100. The rearward view 111 enables a pilot of the aircraft 100 to view objects located behind the aircraft 100 as discussed herein. A heads-up control 130 (shown in FIGS. 9 and 10) generates an image on a heads-up display 120 (shown in FIGS. 3-10) within the cockpit 101 of the aircraft 100 based on the image data from the camera 110 as discussed herein. The size, shape, location, and/or the configuration of the camera 110 and rearward view 111 may be varied depending on the application as would be appreciated by one of ordinary skill in the art having the benefit of this disclosure. For example, one or more cameras 110 may be disposed on the aft portion 102 of the aircraft 100. The aircraft 100 may be various aircraft such as, but not limited to, a commercial airliner or a military aircraft.

Figure 2:
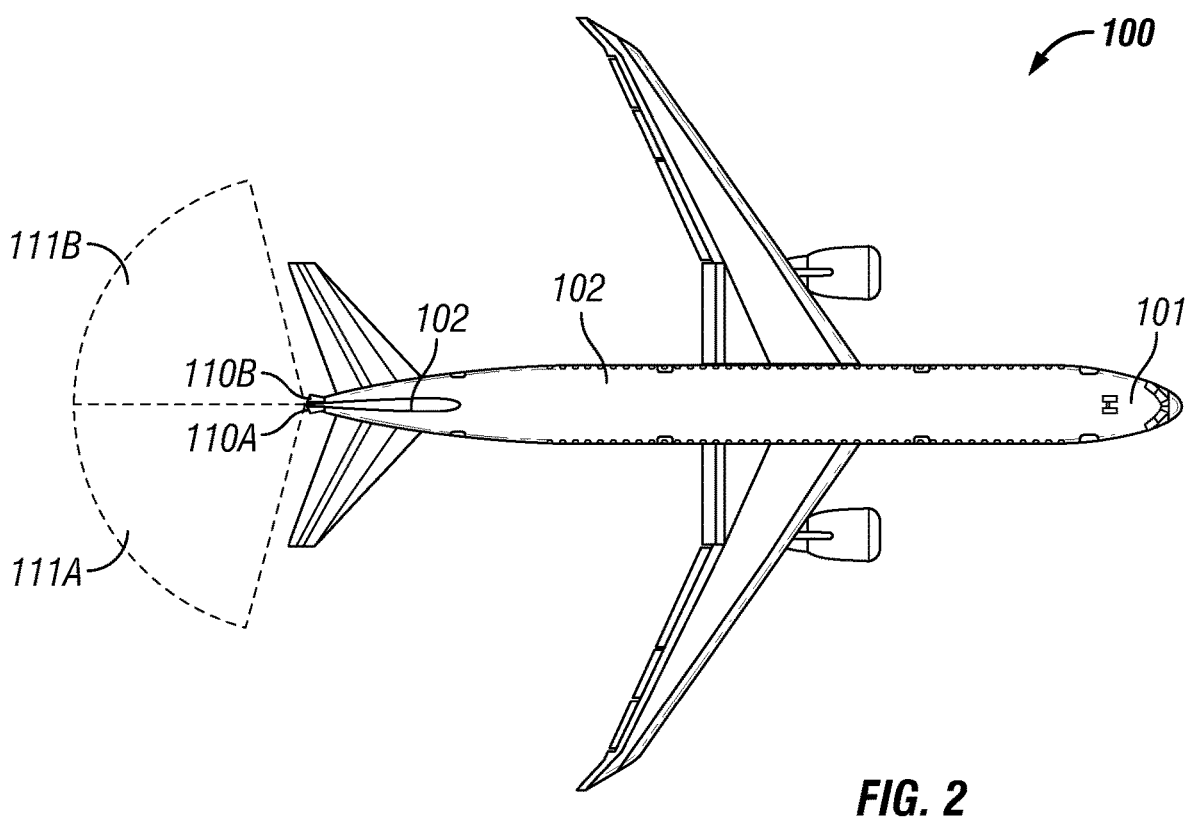
FIG. 2 is a schematic of an example aircraft having one or more cameras positioned to acquire a rearward view behind the aircraft.

FIG. 2 is a schematic of an aircraft 100 having two cameras 110A, 110B disposed on the aft portion 102 of the aircraft 100 to acquire a rearward view 111A, 111B behind the aircraft 100. A first camera 110A is disposed on a right side of the fuselage 103 of the aircraft 100 and a second camera 110B is disposed on a left side of the fuselage 103. The first camera 110A acquires image data from a first rearward view 111A and the second camera 110B acquires image data from a second rearward view 111B.

The heads-up control 130 generates an image on a heads-up display 120 based on the image data from the first camera 110A and the second camera 110B as discussed herein. The image generated by the heads-up control 130 may be a stitched (i.e., several images are combined into a single image that is created by software routines or the like) rearward view based on image data from the first camera and the second camera. The image generated by the heads-up control 130 may be a mirror image of a rearward view 111A, 111B from the aircraft 100 with an image from the first camera 110A and an image from the second camera 110B being flipped side by side on the heads-up display 120. In an embodiment, a portion of the image from the first camera 110A may overlap with a portion of the image from the second camera 110B. The aircraft 100 may include two or more cameras, collectively 110, disposed on the aft portion 102 of the aircraft 100. For example, the aircraft 100 may include three or more cameras 110 on the aft portion 102 of the aircraft 100 to provide a rearward view of the aircraft 100 that may be generated by the heads-up control 130 on the heads-up display 120 within the flight deck, or cockpit 101 of the aircraft 100.

Figure 3:
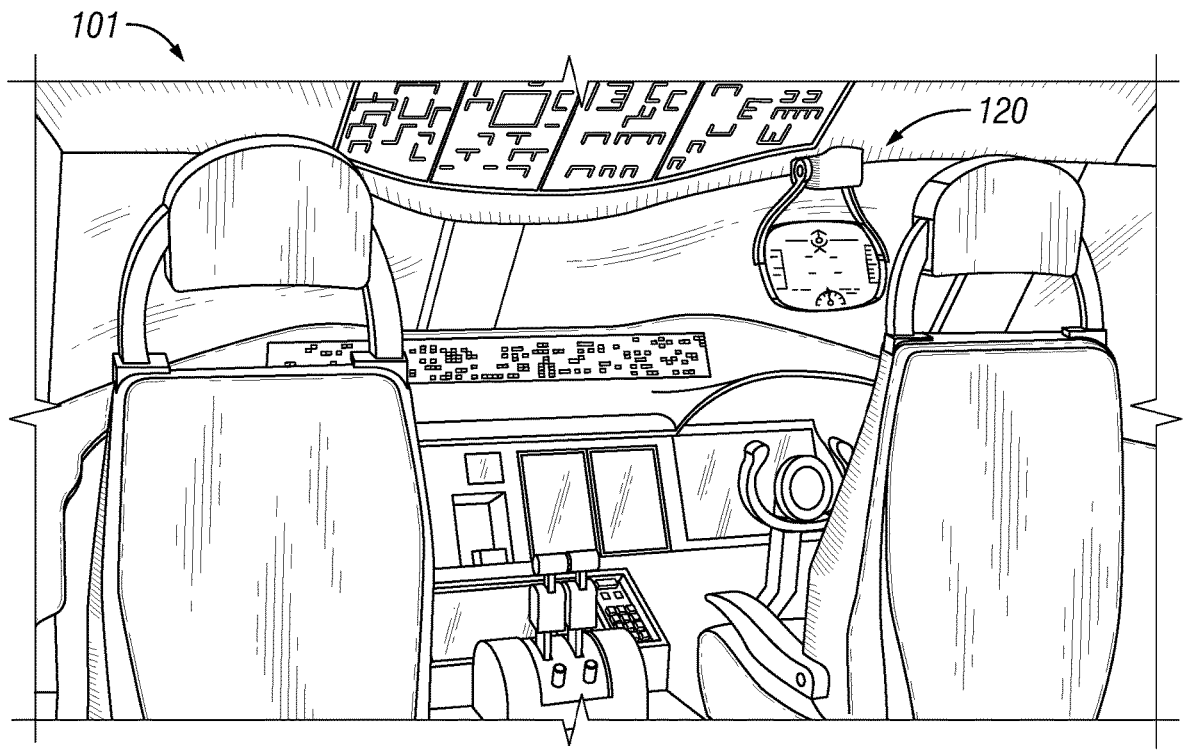
FIG. 3 is a schematic of an example cockpit that includes a heads-up display.
Figure 4:
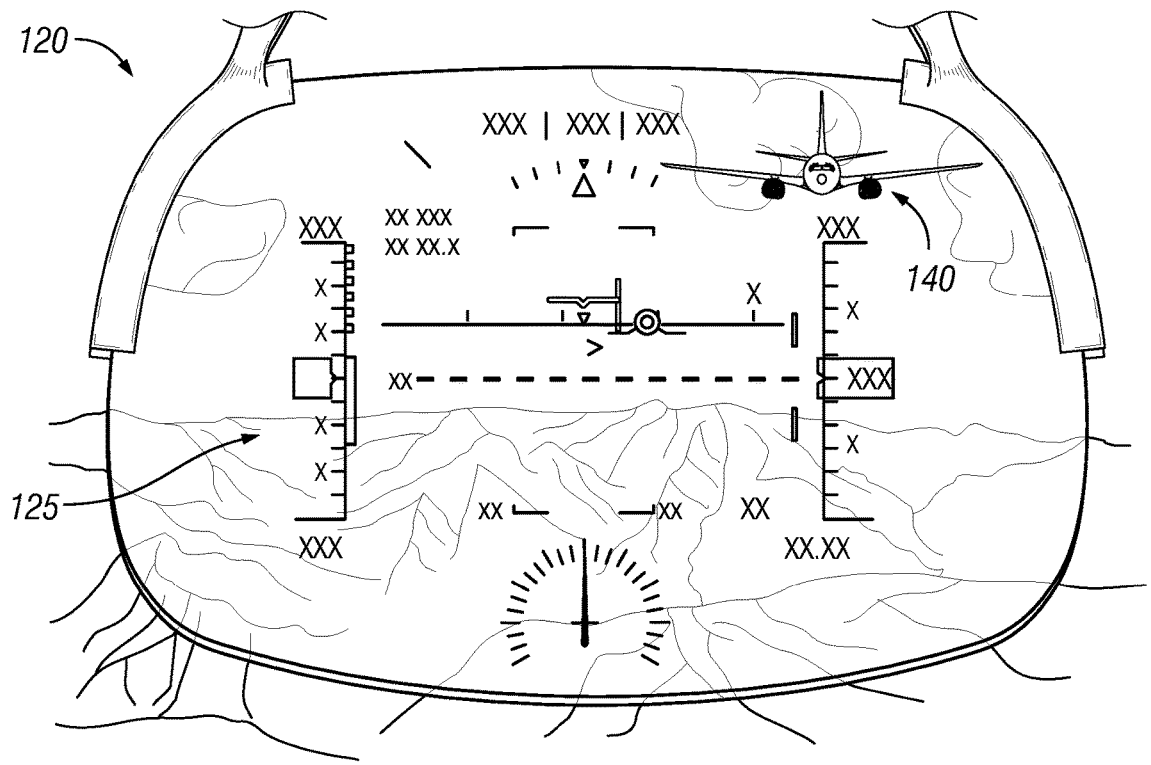
FIG. 4 is a schematic of an example heads-up display.
Figure 5:
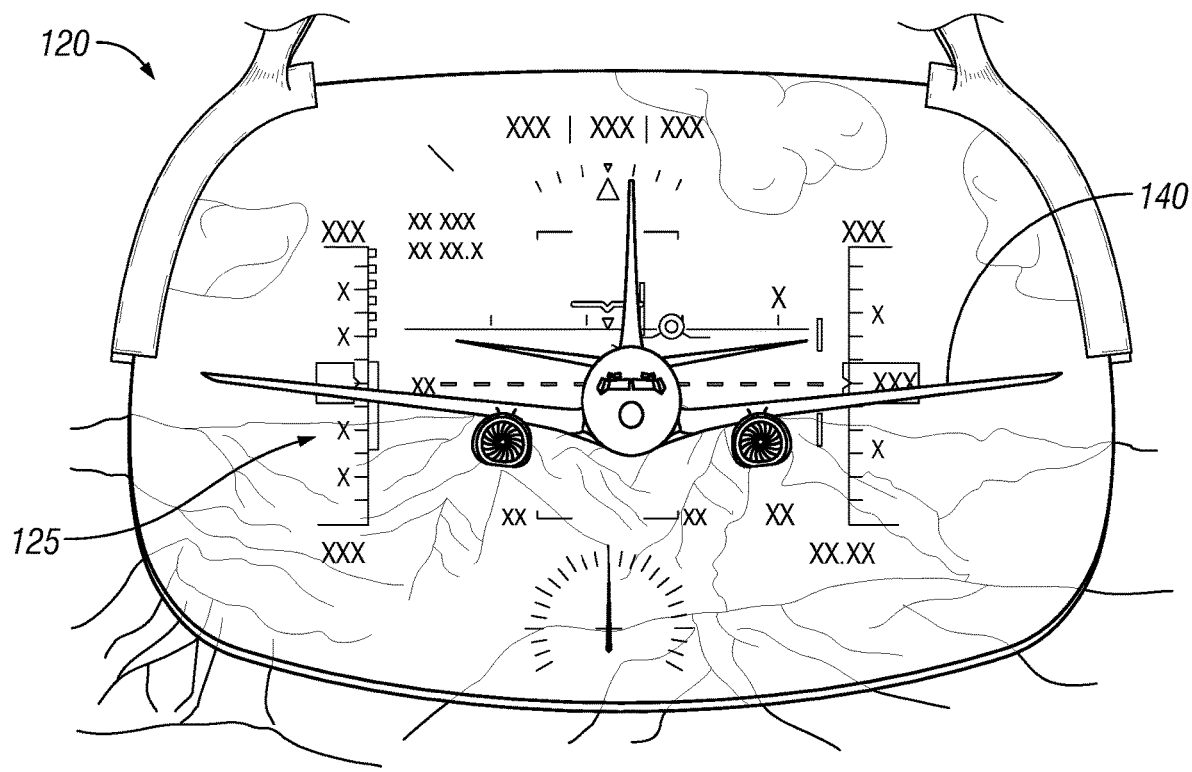
FIG. 5 is a schematic of an example of a heads-up display.

FIG. 3 is a schematic of an example cockpit 101 that includes a heads-up display 120. FIG. 4 shows an example of a heads-up display 120, wherein the heads-up control 130 has determined that a distant aerial vehicle 140 is within a predetermined range behind the aircraft, and has responsively generated a display of the images acquired from the rearward facing cameras (which may include images from a right side camera, and images from a left side camera that includes the aerial vehicle). The heads-up display 120 may display various information or data 125 for viewing in the cockpit. FIG. 5 shows an image 140 of an aircraft that is positioned behind the aircraft 100 overlaid on the data 125 on the heads-up display 120. The heads-up control 130 may generate the image 140 on the heads-up display 120 when an object is detected behind the aircraft 100. Alternatively, the heads-up control 130 may be configured to continuously generate an image 140 of the rearward view of the aircraft 100 on the heads-up display 120.

In an embodiment, the heads-up control 130 is configured to determine when an aerial object is within a predetermined range behind the aircraft 100 and responsively generate the image on the heads-up display 120 based on the image data from the one or more cameras 110 to provide a rearward view of an area behind the aircraft 100 in which the aerial object is located. The aerial object may be another aircraft, a missile, a rocket, or the like. In an embodiment, the heads-up control 130 is configured to determine whether the aerial object is approaching the aircraft 100 via processing the image data from the one or more cameras 110.

Figure 6:
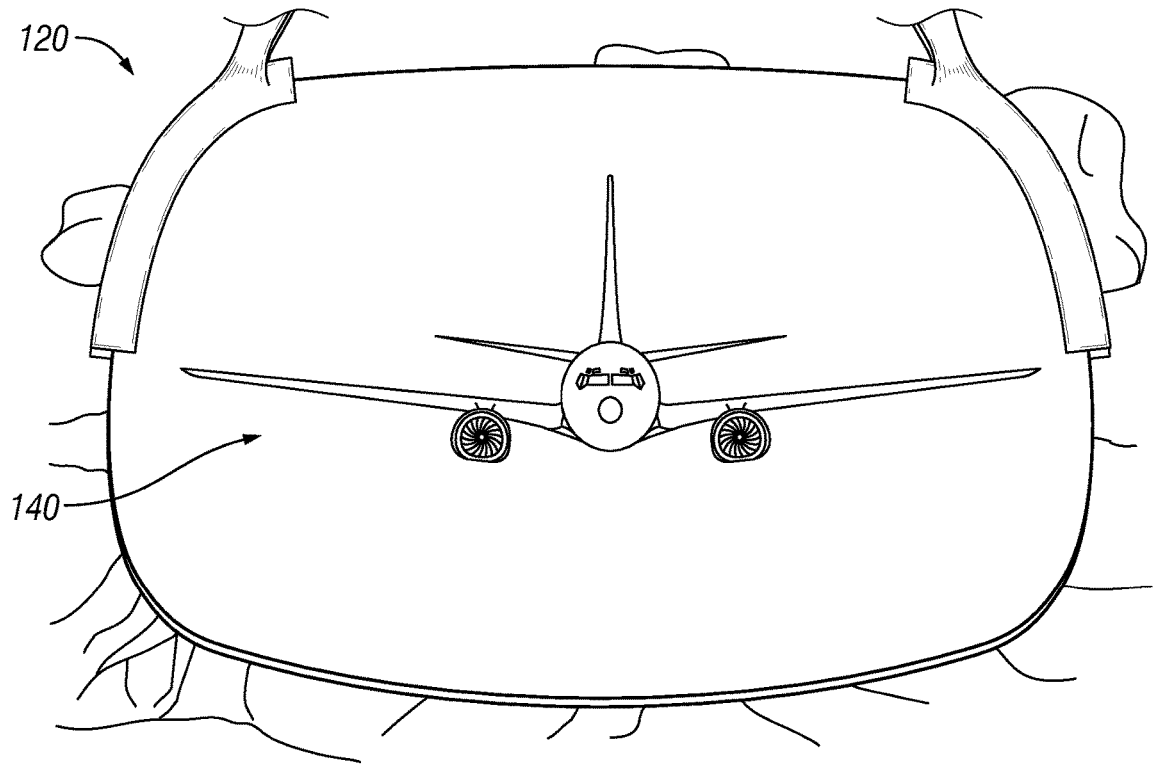
FIG. 6 is a schematic of an example of a heads-up display.

FIG. 6 shows an image 140 of an aircraft positioned behind the aircraft 100 generated on the heads-up display 120. The image 140 of the aircraft may be configured to obscure any information or data 125 previously displayed on the heads-up display 120. The generated image 140 may be generated upon detection of an object behind the aircraft 100, detection of an object within a predetermined range behind the aircraft 100, and/or or upon detection of an object approaching the aircraft 100 from behind as discussed herein.

Figure 7:
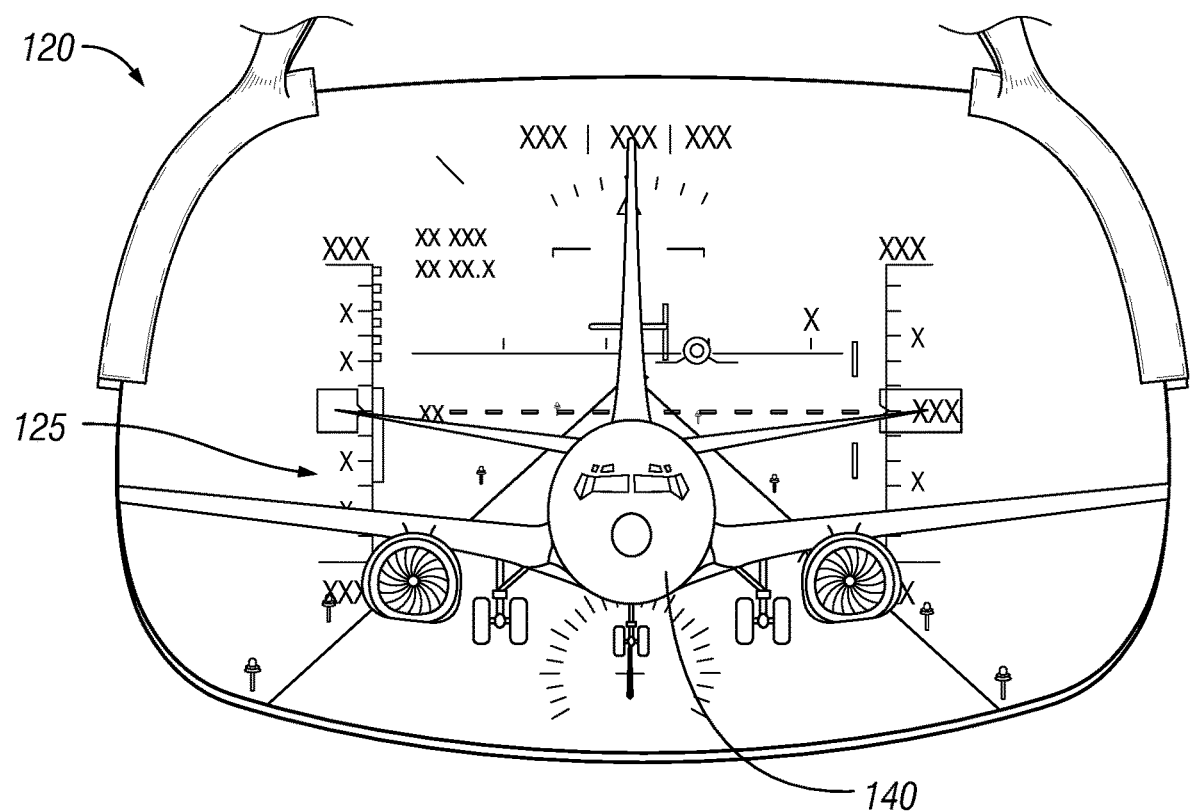
FIG. 7 is a schematic of an example of a heads-up display.

FIG. 7 shows an image 140 of an aircraft that is positioned behind the aircraft 100 with both the aircraft being on the ground. The generated image 140 of the aircraft may be overlaid on the data 125 on the heads-up display 120. As discussed herein, the heads-up control 130 may generate the image 140 on the heads-up display 120 when an object is detected behind the aircraft 100 or alternatively, the heads-up control 130 may be configured to continuously generate an image of the rearward view of the aircraft 100 on the heads-up display 120.

Figure 8:
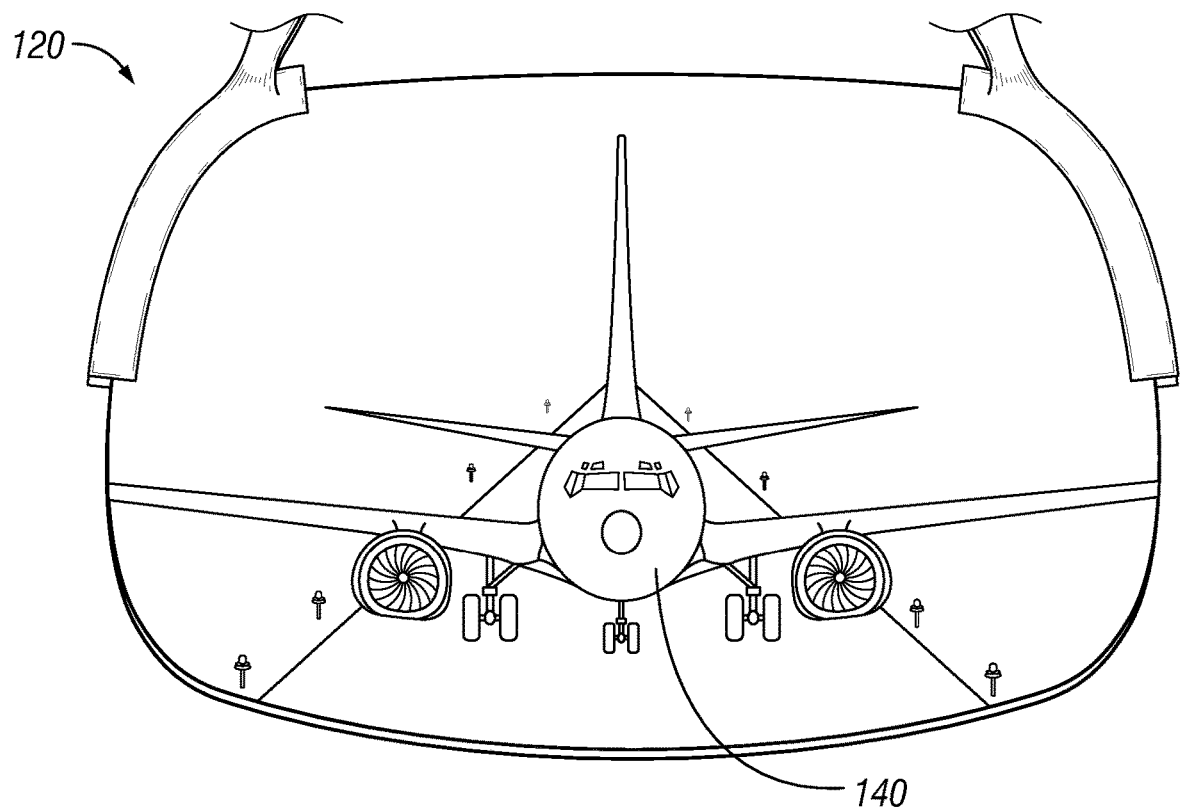
FIG. 8 is a schematic of an example of a heads-up display.

FIG. 8 shows an image 140 of an aircraft on the ground that is positioned behind the aircraft 100 generated on the heads-up display 120. The image 140 may be configured to obscure any information or data 125 previously displayed on the heads-up display 120. The generated image 140 may be generated upon detection of an object behind the aircraft 100, detection of an object within a predetermined range behind the aircraft 100, and/or or upon detection of an object approaching the aircraft 100 from behind as discussed herein.

Figure 9:
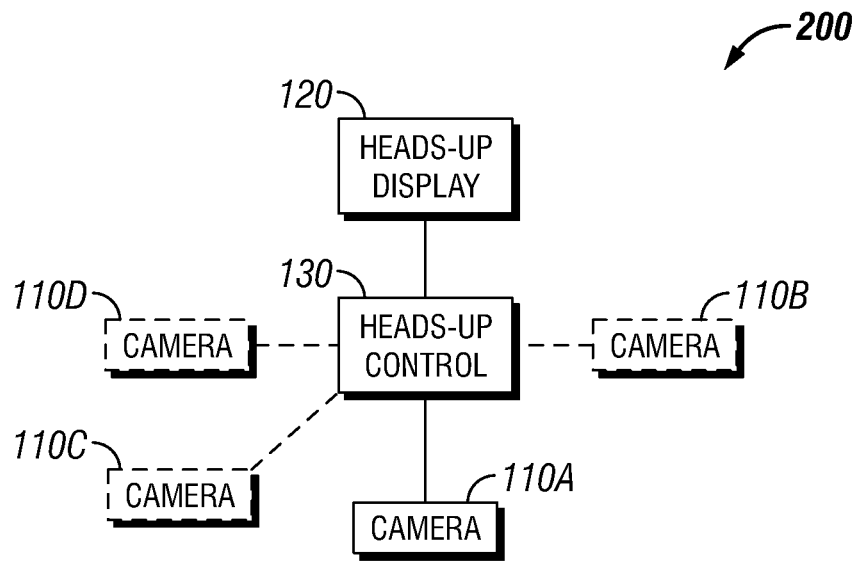
FIG. 9 is a schematic of an example of an apparatus with a heads-up display.

FIG. 9 is a block diagram of an apparatus 200 that includes a heads-up display 120 and a heads-up control 130 connected to the heads-up display 120. The heads-up control 130 generates an image 140 on the heads-up display 120 from image data from a camera 110A disposed on an aft portion 102 of an aircraft 100. The apparatus 200 may include more than one camera 110A, 110B, 110C, 110D. The heads-up control 130 may be integrated with the heads-up display 120.

The generated image 140 may be overlaid on information or data 125 previously displayed on the heads-up display 120 so that the information or data 125 and the generated image 140 are both visible on the heads-up display 120. The generated image 140 may obscure information or data 125 previously displayed on the heads-up display 120. The generated image 140 may be a stitched together image from image data from a first camera 110A disposed on a right side of the aft portion 102 of an aircraft 100 and image data from a second camera 110B disposed on a left side of the aft portion 102 of the aircraft 100. The generated image 140 may be a mirror image of a rearward view from the aircraft 100 with an image from the first camera 110A and an image from the second camera 110B being flipped side by side on the heads-up display 120. The heads-up control 130 may generate the image 140 on the heads-up display 120 in response to determining that an object is within a predetermined range behind the aircraft 100. The object may be in-flight or may be positioned on the ground.

Figure 10:
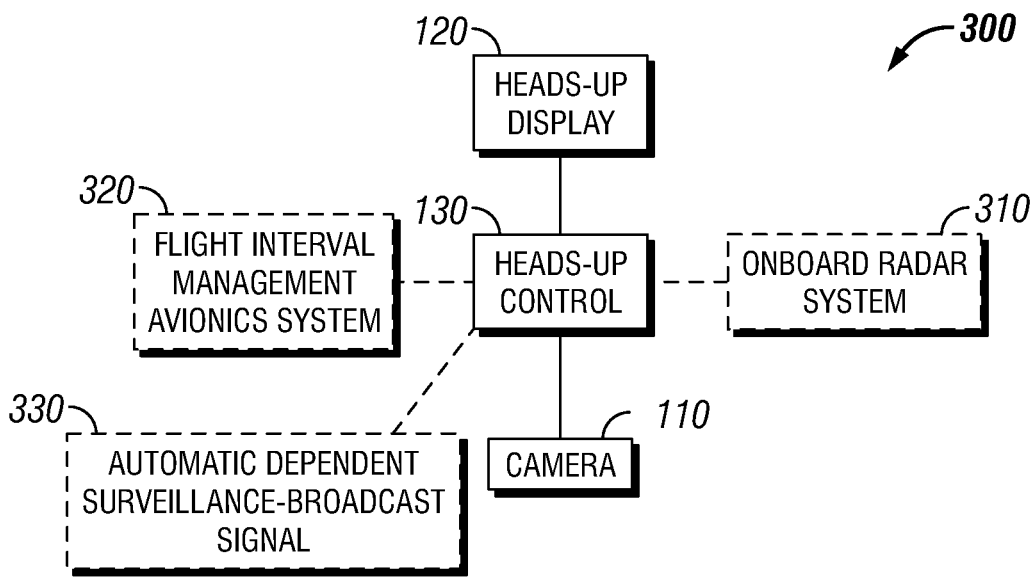
FIG. 10 is a schematic of an example system for an aircraft with a heads-up display.

FIG. 10 is a system 300 that includes one or more cameras 100 disposed on an aft portion 102 of a fuselage 103 of an aircraft 100. The system 300 includes a heads-up display 120 within a cockpit 101 of the aircraft 100. The system 300 includes a heads-up control 130 that receives image data from the one or more cameras 110. The heads-up control 130 is configured to generate an image 140 on the heads-up display 120 based on the image data from the one or more cameras 110 to provide a rearward view of an area behind the aircraft 100.

The heads-up control 130 may be configured to determine when an aerial object is within a predetermined range behind the aircraft 100 and responsively generate the image 140 on the heads-up display 120 based on the image data from the one or more cameras 110 to provide a rearward view 111 of an area behind the aircraft 100 in which the aerial object is located. The aerial object may be an aircraft, a missile, or a rocket. The heads-up control 130 may be configured to determine whether the aerial object is approaching the aircraft 100 via processing the image data.

The system 300 may include an onboard radar system 310. The heads-up control 130 may be configured to determine when an aerial object is within a predetermined range behind the aircraft 100 based on data from the onboard radar system 310. The heads-up control 130 may be configured to determine when an aerial object is within a predetermined range behind the aircraft 100 based on information from a flight interval management (FIM) avionics system 320. The heads-up control 130 may be configured to determine when an aerial object is within a predetermined range behind the aircraft 100 based on an automatic dependent surveillance-broadcast (ADS-B) signal 330. The heads-up control 130 may generate the image 140 on the heads-up display 120 when the heads-up control 130 determines the aerial object is within the predetermined range. The heads-up control 130 may be configured to determine when a second aircraft is behind the aircraft 100 and may generate the image 140 on the heads-up display 130 based on the image data from the one or more cameras 110 to provide a rearward view of an area behind the aircraft 100 when both aircraft are on the ground.

Figure 11:
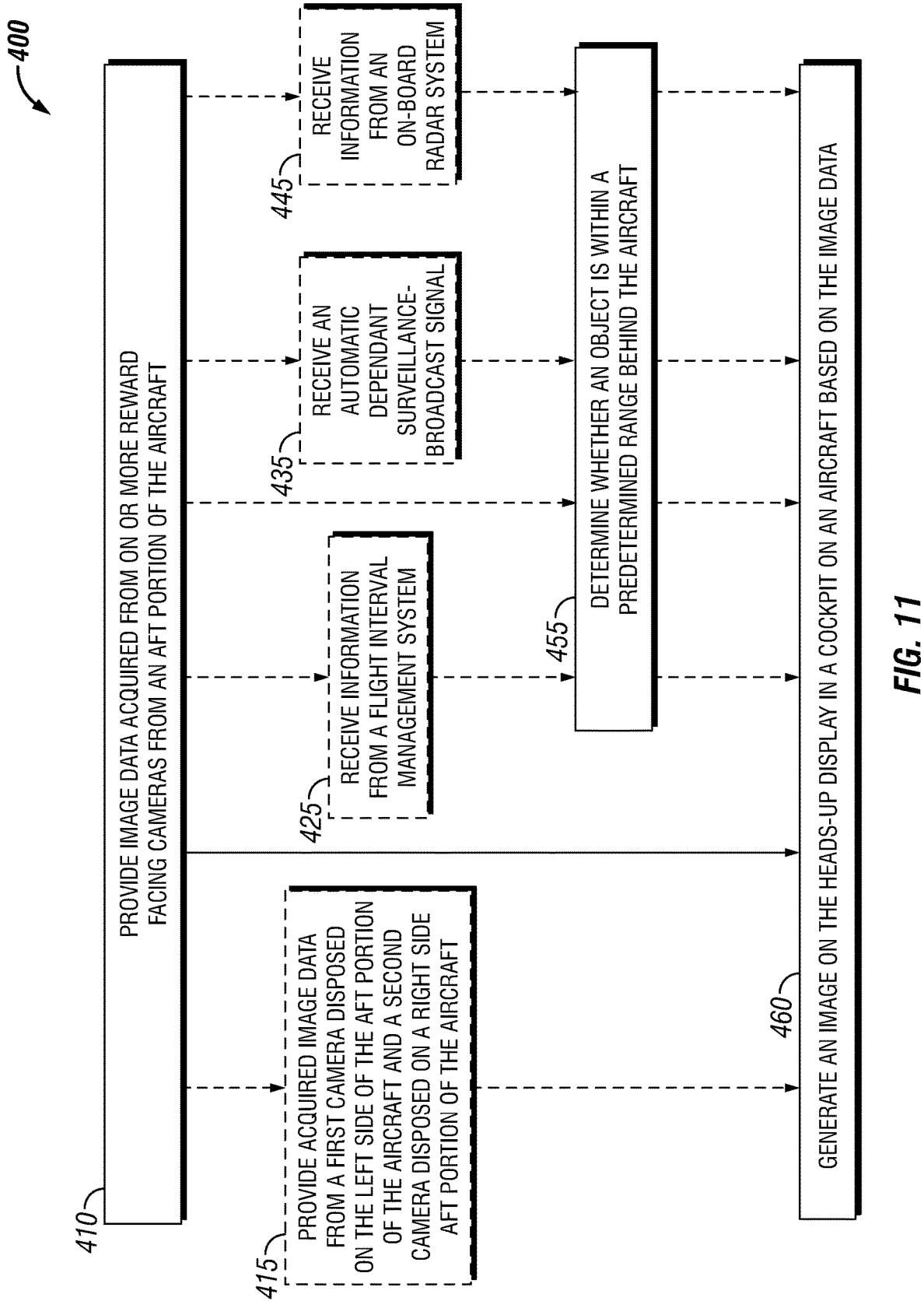
FIG. 11 is a flow chart for an example method for providing a rearward view of an aircraft.

FIG. 11 is a flow chart for a method 400 for providing a rearward view of an aircraft. The method 400 includes providing image data acquired from one or more rearward facing cameras from an aft portion of the aircraft, at 410. The method 400 includes generating an image on a heads-up display in a cockpit of an aircraft based on the image data, at 460. The method 400 may include providing acquired image data from a first camera disposed on a right side of the aft portion of the aircraft and a second camera disposed on a left side of the aft portion of the aircraft, at 415. For example, the image data from the first and second cameras 110A, 110B may be used to generate an image 140 on the heads-up display 120 comprising generating a stitched rearward view.

The method 400 may include determining whether an object is within a predetermined range behind the aircraft prior to generating the image on the heads-up display, at 455. The method 400 may include receiving information from a flight interval management (FIM) avionics system, at 425. The information from a FIM avionics system 320 may be used to determine whether an object is within a predetermined range behind the aircraft prior to generating the image on the heads-up display, at 455. The method 400 may include receiving an automatic dependent surveillance-broadcast (ADS-B) signal, at 435. The ADS-B signal 330 may be used to determine whether an object is within a predetermined range behind the aircraft prior to generating the image on the heads-up display, at 455. The method 400 may include receiving information from an on-board radar system, at 445. The information from the on-board radar system 310 may be used to determine if the object is within the predetermined range of the aircraft, at 455.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof

What is claimed is:

1. A system for an aircraft, the system comprising:
one or more cameras disposed on an aft portion of a fuselage of the aircraft;
a heads-up display within a cockpit of the aircraft;
a heads-up control that receives image data from the one or more cameras; and
wherein the heads-up control is configured to determine whether an in-flight aerial object is approaching the aircraft from behind by processing the image data from the one or more cameras and to determine when the in-flight aerial object is within a predetermined range behind the aircraft and in response to the detection of the in-flight aerial object within the predetermined range, the heads-up control responsively generates an image on the heads-up display based on image data from the one or more cameras to provide a rearward view of an area behind the aircraft in which the aerial object is located.

2. The system of claim 1, wherein the aerial object is an aircraft, a missile, or a rocket.

3. The system of claim 1, wherein the one or more cameras comprise a first camera disposed on a right side of the aft portion of the fuselage and a second camera disposed on a left side of the aft portion of the fuselage.

4. The system of claim 3, wherein the heads-up control receives image data from the first camera and the second camera, and wherein the rearward view comprises a stitched rearward view based on image data from the first camera and the second camera.

5. The system of claim 4, wherein the heads-up control is configured to determine whether the aerial object is approaching the aircraft via processing the image data.

6. The system of claim 1, comprising an onboard radar system, wherein the heads-up control is configured to determine when the in-flight aerial object is within the predetermined range behind the aircraft based on data from the onboard radar system and to continuously generate the image to provide the rearward view of the aircraft on the heads-up display when the in-flight aerial object is within the predetermined range behind the aircraft.

7. The system of claim 1, wherein the heads-up control is configured to determine when the in-flight aerial object is within the predetermined range behind the aircraft based on information from a flight interval management (FIM) avionics system.

8. The system of claim 1, wherein the heads-up control is configured to determine when the in-flight aerial object is within the predetermined range behind the aircraft based on an automatic dependent surveillance-broadcast (ADS-B) signal.

9. The system of claim 1, wherein the heads-up control is configured to determine when a second aircraft is behind the aircraft and generates the image on the heads-up display based on the image data from the one or more cameras to provide a rearward view of an area behind the aircraft and wherein the aircraft and the second aircraft are on the ground.

10. An apparatus comprising:
a heads-up display;
a heads-up control connected to the heads-up display; and
wherein the heads-up control generates an image on the heads-up display from image data from one or more cameras disposed on an aft portion of an aircraft, in response to determining that an in-flight aerial object is within a predetermined range behind the aircraft.

11. The apparatus of claim 10, wherein the generated image is overlaid on information previously displayed on the heads-up display so that the information and the generated image are both visible on the heads-up display.

12. The apparatus of claim 10, wherein the generated image obscures information previously displayed on the heads-up display.

13. The apparatus of claim 10, wherein generated image comprises a stitched together image from image data from a first camera disposed on a right side of the aft portion of an aircraft and image data from a second camera disposed on a left side of the aft portion of the aircraft.

14. The apparatus of claim 13, wherein the generated image is a mirror image of a rearward view from the aircraft with an image from the first camera and an image from the second camera being flipped side by side on the heads-up display.

15. A method for providing a rearward view of an aircraft, the method comprising:
providing image data acquired from one or more rearward facing cameras from an aft portion of the aircraft;
generating an image on a heads-up display in a cockpit of an aircraft based on the image data; and
determining based on the image data whether an in-flight aerial object is within a predetermined range behind the aircraft prior to generating the image on the heads-up display.

16. The method of claim 15, wherein providing image data comprises providing acquired image data from a first camera disposed on a right side of the aft portion of the aircraft and a second camera disposed on a left side of the aft portion of the aircraft, and generating an image on the heads-up display comprising generating a stitched rearward view based on image data from the first camera and the second camera.

17. The method of claim 15, further comprising receiving information from a flight interval management (FIM) avionics system, receiving an automatic dependent surveillance-broadcast (ADS-B) signal, or receiving information from an on-board radar system to determine if the in-flight aerial object is within the predetermined range of the aircraft.

18. The system of claim 1, wherein the generated image is overlaid on information previously displayed on the heads-up display so that the information and the generated image are both visible on the heads-up display.

19. The system of claim 1, wherein the generated image obscures information previously displayed on the heads-up display.

20. The system of claim 1, wherein the generated image is a mirror image of a rearward view from the aircraft.

* * * * *